May 14, 1968 A. J. GOLDSTEIN 3,383,661

ARRANGEMENT FOR GENERATING PERMUTATIONS

Filed Sept. 30, 1964 3 Sheets-Sheet 1

INVENTOR
A. J. GOLDSTEIN
BY Lucian C. Canepa
ATTORNEY

ARRANGEMENT FOR GENERATING PERMUTATIONS

Filed Sept. 30, 1964

May 14, 1968 A. J. GOLDSTEIN 3,383,661

ARRANGEMENT FOR GENERATING PERMUTATIONS

Filed Sept. 30, 1964 3 Sheets-Sheet 3

United States Patent Office 3,383,661

Patented May 14, 1968

3,383,661

ARRANGEMENT FOR GENERATING PERMUTATIONS

Alan J. Goldstein, Livingston, N.J., assignor to Bell Telephone Laboratories, Incorporated, New York, N.Y., a corporation of New York Filed Sept. 30, 1964, Ser. No. 400,329
8 Claims. (Cl. 340—172.5)

ABSTRACT OF THE DISCLOSURE

An arrangement is proposed for generating the permutations of a set of input signals. The arrangement provides for implementing an algorithm which embodies a plurality of nested iteratively traversed functional loops. The outer loop partitions the signals into fixed size subsets, and the inner loops respectively comprise signal interchanging routines for generating the permutations of a corresponding subset of signals.

Figure 1A:
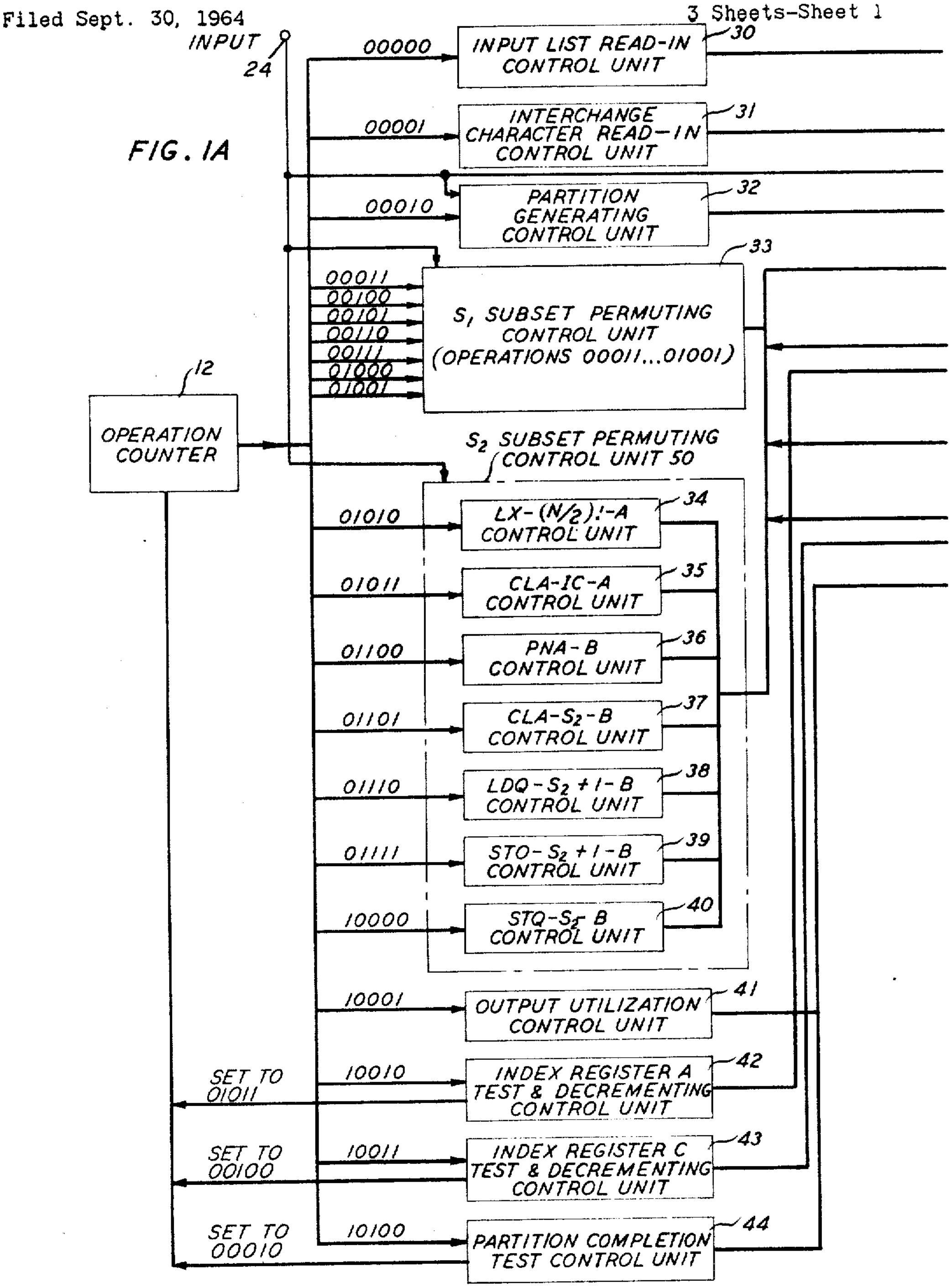

This invention relates to digital calculating arrangements and, more specifically, to a circuit combination which generates each of the possible orderings, or permutations, of a set of input items.

Many investigations of practical interest require for their solution the generation of each possible permutation of a list of input quantities. Typical of these combinatoric and topological inquiries is the well-known traveling salesman problem, wherein it is desired to find the shortest route covering each of a fixed set of N cities identified by the characters 0, 1, . . . , N. A desirable route between the N cities may be determined by first generating all possible orderings of the 0 through N city designations, and computing each corresponding route length by summing the distances between the cities identified by contiguous city-identifying numerals. It then remains only to select the path characterized by the minimum tour length.

However, the solution of the above and other, similar type problems is dependent upon some calculating structure for systematically generating the permutations of the set of input items. Moreover, it is desirable that such a calulator embody electronic circuitry in order to simplify the interface between the permutation generating arrangement and an appropriate work circuit which is to operate on the permutations, such as an electronic adder to compute the route lengths in the above-described traveling salesman situation. However, a relatively simple and economical electronic calculator for generating the permutations of an input list has heretofore been undisclosed.

It is therefore an object of the present invention to provide a calculating arrangement which generates each of the possible permutations of a set of input quantities.

More specifically, an object of the present invention is the provision of an electronic calculating arrangement which rapidly and efficiently generates the permutations of any size input list.

These and other objects of the present invention are realized in a specific, illustrative calculating arrangement which includes control circuitry for reading a list of input quantities and a set of interchange characters into an operand digital store, and a partition generator for subdividing the input list into two approximately like size disjoint subsets $S_1$ and $S_2$. The interchange characters are in effect instructions for directing certain of the operations of the calculating arrangement.

The calculating arrangement further includes circuitry for generating each of the possible permutations or orderings of the subset $S_1$ for each of the partitionings of the input list effected by the partition generator. Such orderings are generated by sequentially interchanging contiguous subset quantities or elements. The various interchanges to be effected are specified by the interchange characters contained in the operand store. Circuitry is also included for generating all of the permutations of the subset $S_2$ by sequentially performing element interchanging operations for each of the $S_1$ subset orderings generated by the $S_1$ subset permuting circuitry.

It is thus a feature of the present invention that a permutation generating arrangement include circuitry for reading a list of input items into an operand store, circuitry for generating a plurality of partitions of the input quantities into two like size disjoint subsets $S_1$ and $S_2$, circuitry responsive to each partitioning of the input quantities by the generating circuitry for effecting a plurality of permutations of the elements included in the $S_1$ subset, and circuitry responsive to each permutation of the $S_1$ subset for generating a plurality of permutations of the elements included in the $S_2$ subset.

It is another feature of the present invention that permutation generating circuitry comprise an operand memory for storing therein a set of input objects and a plurality of interchange characters, and circuitry for sequentially interchanging contiguous ones of the stored input objects in accordance with the set of stored interchange characters.

Figure 1B:
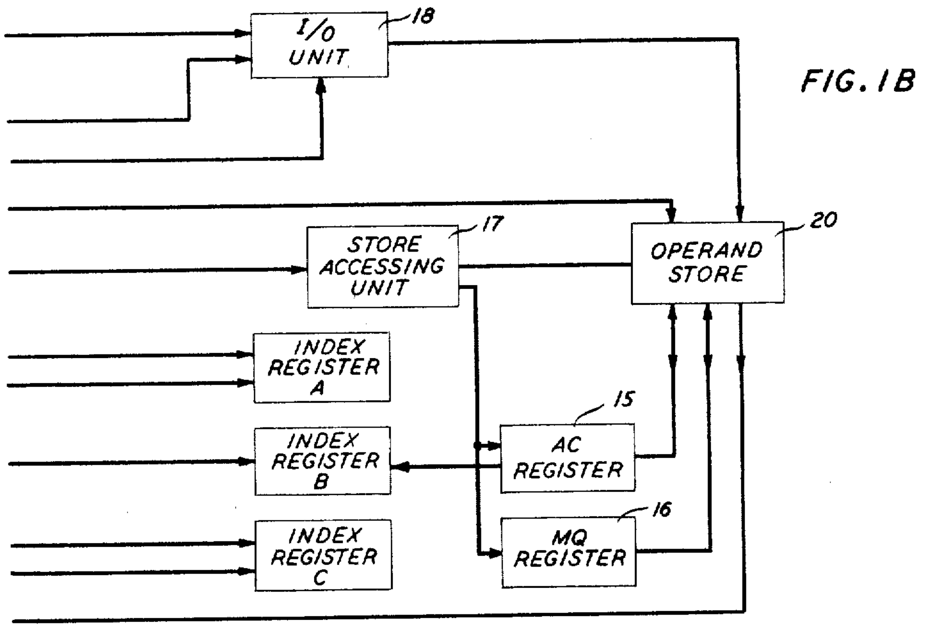
Figure 2:
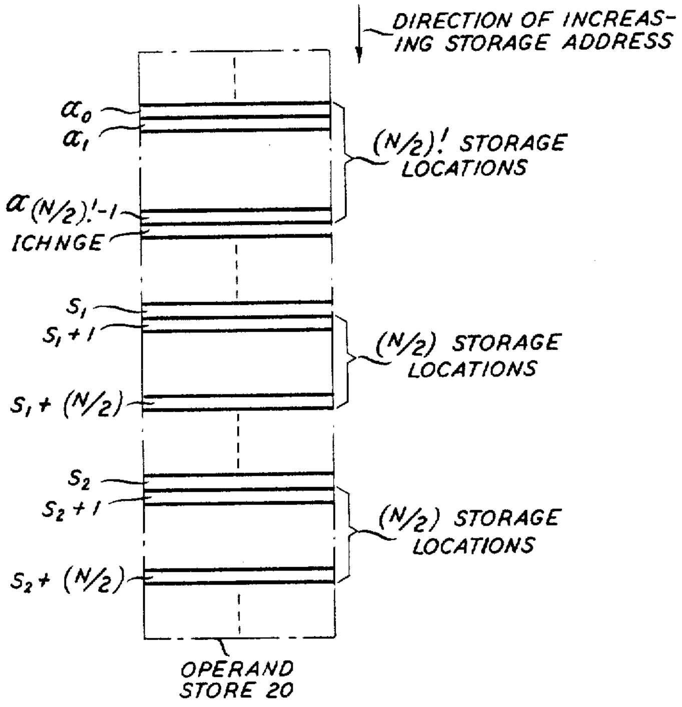
Figure 3:
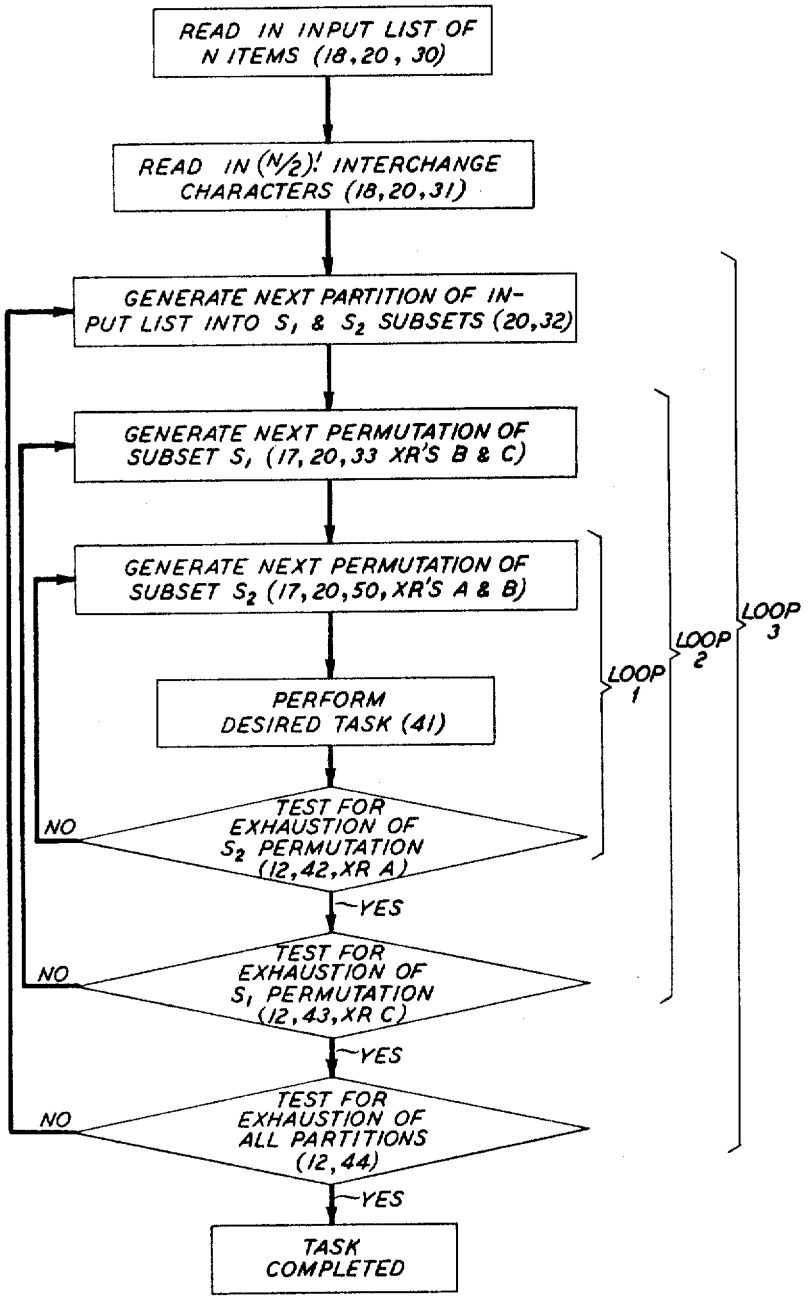

A complete understanding of the present invention and of the above and other features, advantages and variations thereof may be gained from a consideration of the following detailed description of an illustrative embodiment thereof presented hereinbelow in conjunction with the accompanying drawing, in which:

FIGS. 1A and 1B respectively comprise the left and right portions of a block diagram of a specific, illustrative permutation generating arrangement which embodies the principles of the present invention;

FIG. 2 is a diagram depicting the information storage pattern characterizing an operand store 20 included in FIG. 1B; and FIG. 3 is a signal flow diagram illustrating the functional operation of the permutation generating arrangement shown in FIGS. 1A and 1B.

Referring now to FIGS. 1A and 1B, hereinafter referred to as composite FIG. 1, there is shown a specific, illustrative permutation generating arrangement for generating all the possible orderings of a set of N input objects. The embodiment comprises an accumulator (AC) register 15 and an MQ register 16 each connected to an operand digital information store 20.

Information is read into the store 20 via an input-output supervisory unit 18 responsive to enabling signals supplied thereto by two read-in control units 30 and 31 and to input information applied over an input lead 24. In addition, digital information is translated between the AC and MQ registers 15 and 16, and the operand store 20, under control of a store accessing unit 17. The particular storage location activated by the store accessor 17 is, in turn, dependent upon the specifically enabled one of a plurality of store-energizing control units 33 through 40, which are operative in conjunction wth three index registers A, B and C. In other words, the control units 33 through 40, which are operative in conjunction with the index registers A, B, and C, control the store accessor 17 which, in turn, controls the translation of information between the AC and MQ registers 15 and 16, and the operand store 20. The units 33 and 50 are essentially identical, and only the latter has been illustrated in detail in FIG. 1. The sole significant difference therebetween is that the units 33 and 50 are respectively operable in conjunction with the index registers C and A. Further, the two control units 33 and 36 are functionally operative to translate digital information from the AC register 15 to the index register B.

An operation counter 12 is included in the FIG. 1 organization to sequentially energize the system control units 30 through 44 in a normal top-to-bottom order. The operation counter 12 may advantageously comprise a five-stage binary counter and pulse distribution circuitry connected thereto for enabling a selected control unit when the digital count included in the counter corresponds to the binary control number illustrated alongside the control unit input lead in FIG. 1. Each time a particular control unit is enabled by the operation counter 12, the count of the counter 12 is increased by one such that the following control unit may next be activated. In addition, three testing control units 42 through 44 are selectively operable to set the operation counter 12 to the digital states 01011, 00100, and 00010, respectively, such that the control units 35, 33 and 32 will next be enabled by the counter 12. The purpose of this will be discussed later.

At this point, the particular circuit functioning effected by each of the control units 30 through 44 will be considered. Assume now, that it is desired to generate each of the permutations of a list of N items applied over the input lead 24. The input read-in control unit 30, which is first enabled by the operation counter 12, is operative in conjuction with the input-output supervisory unit 18 to store the N items in digital form in N discrete address locations in the operand store 20. The next unit energized by the operation counter 12, viz., the interchange character read-in control unit 31, is adapted, along with the input-output unit 18, to read a plurality of interchange characters, also applied over the input lead 24, into a plurality of contiguous storage locations which immediately precede a store 20 address location ICHNGE shown in the FIG. 2 illustration of the store 20. The number and particular nature of these characters is described in detail hereinafter. It is noted that the control units 30 and 31 function solely to initialize the operand store 20, and that these arrangements are enabled by the operation counter 12 only once during the process of generating all of the desired permutations.

The partition-generating control unit 32 operates to subdivide the N input objects into two disjoint subsets $S_1$ and $S_2$ which contain the same, or nearly the same, number of elements. It will hereinafter be assumed that each of the subsets $S_1$ and $S_2$ comprise $N/2$ elements. Each time the partition generating control unit 32 is enabled by the operation counter 12, it operates to generate a new partitioning of the N input objects into two subsets $S_1$ and $S_2$ each containing $N/2$ elements, and to store these subsets in two storage lists each comprising $N/2$ locations which respectively directly follow the store addresses $S_1$ and $S_2$ illustrated in the FIG. 2 representation of the store 20. That is, the elements of the partitioned subset $S_1$ for example, reside in the storage locations $S_1+1$, $S_1+2$, . . . $S_1+N/2$. The control unit 32 may advantageously embody a general purpose computing machine employing any of the well-known algorithms for partitioning a set of objects. In this case, for each partitioning of the N elements, the control unit 32 would simply read out the N elements from the operand store 20, perform the desired partioning, and then write the N elements back into the operand store 20 in the new partitioned arrangement. Alternatively, the unit 32 may comprise a memory arrangement which specifically includes all of the $$\frac{N!}{\left(\frac{N}{2}\right)!\cdot\left(\frac{N}{2}\right)!}$$

existing distinct partitions of the N input objects. In this case, at the beginning of each permutation process, the control unit 32 would generate each of the $$\frac{N!}{\left(\frac{N}{2}\right)!\cdot\left(\frac{N}{2}\right)!}$$

distinct partitions and store them in a memory pending the time each is to be used in the permutation process. It is noted that the term $$\frac{N!}{\left(\frac{N}{2}\right)!\cdot\left(\frac{N}{2}\right)!}$$

represents the number of combinations of the $N/2$ items taken from N, that is, the number of ways of separating N items into two groups of $N/2$ items each. This is well known in combinatorial analysis.

The composite $S_1$ subset permuting control unit 33 is functionally adapted to generate each of the possible orderings of the subset $S_1$ each time a new partitioning of the N input quantities is effected by the partition generating control unit 32. Similarly, the composite $S_2$ subset permuting control unit 50 produces each of the orderings of the subset $S_2$ each time a new permutation of the subset $S_1$ is generated by the composite control unit 33.

With regard to the basic theory underlining the subset permuting control units 33 and 50, I have discovered that for every ordered set of $k$ quantities, there exists a set of $k!$ interchange characters which can be used to designate or produce the $k!$ permutations of the $k$ quantities according to the procedure described below. Each interchange character comprises a number $a$ of a value $1\leq a\leq k-1$, wherein a particular value of $a$ dictates an interchange of the $a$th and the $(a+1)$th ordered elements of the set. For example, if a set consists of the ordered elements 1, 2, 3, and 4, the interchange characters 1, 3, and 2 would respectively designate or generate the permuted sets 2, 1, 3, and 4; 2, 1, 4, and 3; and 2, 4, 1, and 3. In generalized terms for a set of $k+1$ elements, the $(k+1)!$ interchange characters $a_{k+1}(j)$, $0\leq j\leq(k+1)!-1$ may be generated by the recursive formulae:

$$a_3(j)=\begin{cases}1\\2\end{cases} \qquad (1)$$

if $j$ is odd otherwise; and $$a_{k+1}(j)=\begin{cases}k \text{ if } j^*=0 \text{ or } k!\\ a_k\left((k-1)!\left[\frac{j-k}{k^*}\right]+k-j^*\right) \text{ if } j^*<k!\\ a_k\left((k-1)!\left[\frac{j-k}{k^*}\right]+k+j^*\right) \text{ if } j^*>k!\end{cases} \qquad (2)$$

for $k\geq3$, where $a_r(x)=a_r(x+r!)$, $k^*=k!+(k-1)!$, and wherein $j^*=j-k \pmod{k^*}$ such that $0\leq j^*<k$ and $[x]$ denotes the greatest integer not exceeding $x$. In the symbology employed in Equation 2, $a_{k+1}(j)$ is interpreted to mean the $j^{th}$ interchange character for a set of $k+1$ elements or quantities to be interchanged.

As noted hereinabove, the composite subset permuting control units 33 and 50 respectively generate the permutations of the subsets $S_1$ and $S_2$ each of which contains $N/2$ distinct elements. Accordingly $(N/2)!$ positive interchange characters $a_0$ through $$a_{\left(\frac{N}{2}\right)!-1}$$

of a value of $$\left(\frac{N}{2}\right)-1$$

or less are required. Therefore, the aforementioned interchange character read-in control unit 31 is operative to write the $(N/2)!$ characters into the $(N/2)!$ storage addresses which precede the address location ICHNGE shown in FIG. 2.

The particular manner in which successive permutations of the subsets $S_1$ and $S_2$ are generated may be illustrated by considering the control units 34 through 40 associated with the element group $S_2$. During the first energization of the composite structure 50, the $$LX-(N/2)!-A$$

control unit 34 operates to load index register A with the digital number $(N/2)!$. This number could either be applied over the lead 24 to the control unit 34 or computed by the control unit 34 from information applied over the lead 24. The *CLA—IC—A* control unit 35, which is next enabled by the operation counter 12, clears the accumulator 15 and adds thereto the contents of an operand store 20 address corresponding to the location ICHNGE less a number of storage locations equal to the digital integer contained in the index register A. Since the register A initially contains the number $(N/2)!$, the control unit 35 is adapted to place the contents of storage address $\alpha_0$ shown in FIG. 2, which is $(N/2)!$ storage locations back of the address ICHNGE, in the accumulator 15. The digital word stored in the address $\alpha_0$ is the first element interchange character $a_0$ and, accordingly, this number is placed in the AC register 15.

The next following *PNA—B* control unit 36 functions to place the negative of the number in the accumulator 15, viz., $-a_0$, in the index register B. The *CLA—S₂—B* control unit 37 is then operative to clear the accumulator 15 and add thereto the contents of a storage address corresponding to the locations $S_2$ minus a number of addresses equal to the number contained in the index register B. Since the register B contains the digital number $-a_0$, the input quantity contained at the operand store 20 address $S_2+a_0$, viz., the $a_0$th element of the subset $S_2$, is placed in the accumulator register 15. In a similar manner, the *LDQ—S₂+1—B* control unit 38 is operative to load the MQ register 16 with the contents of a storage address corresponding to the location $S_2+1$ minus the integer contained in the index register B. This address, viz., $S_2+1-(a_0)=S_2+(|a_0|+1)$, contains the $(a_0+1)$th element of the subset $S_2$.

The succeeding *STO—S₂+1—B* control unit 39 functions to store the contents of the AC register 15, in this case the $a_0$th element of the subset $S_2$, in an address in the store 20 corresponding to the location $S_2+1$ minus the contents of the index register B, which is the address $S_2+(a_0+1)$. This corresponds to the location previously occupied by the $(a_0+1)$th element of the subset $S_2$. Similarly, the *STQ—S₂—B* control unit 40, which comprises the final $S_2$ subset permuting structure, stores the contents of the NQ register 16, in this case the $(a_0+1)$th element of the subset $S_2$, in the address $S_2+a_0$ which previously contained the $a_0$th element of the $S_2$ subset.

Thus, it may be observed that the control units 34 through 40 have effected the desired result of interchanging the storage locations of the $a_0$th and the $(a_0+1)$th elements of the subset $S_2$ in accordance with the interchange character $a_0$ contained in the operand store 20. It is noted that the control units 34 through 40, along with others of the control units shown in FIG. 1, may advantageously comprise pulse distribution circuits for generating signals to effect the corresponding circuit functioning or, alternatively, may comprise a plurality of stored binary digits followed by a common command decoder embodiment of any of the types well known in the art. Typical of such control circuitry is that discussed in Ledley, R. S., "Digital Computer and Control Engineering," McGraw-Hill, 1962, on pages 28, 30 through 32, 553 and 554.

An index register testing and decrementing control unit 42 shown in FIG. 1 is operative to examine the contents of the index register A. If register A contains a digital number greater than 1, which condition indicates that each of the $(N/2)!$ possible orderings of the subset $S_2$, has not been generated, the unit 42 functions to decrease the contents of the index register A by 1, and also to write the binary number 01011 into the operation counter 12. The counter 12 will hence next enable the *CLA—IC—A* control unit 35, thereby causing the next permutation of the subset $S_2$ to be generated in accordance with the next interchange character stored in the operand store 20.

When the testing control unit 42 detects a digital 1 stored in the register A, which indicates that each of the $(N/2)!$ permutations of the subset $S_2$ has been produced, the unit 42 is inactive hence permitting the operation counter 12 to next enable the index register C testing and decrementing unit 43. The unit 42 may comprise any digital comparator and subtracting circuitry well known in the art, or such structure may be included in the associated index register A. In this latter case, the control unit 42 would simply comprise a pulse distribution arrangement.

The two remaining testing units 43 and 44 are similar in organization to the control unit 42, and are adapted to respectively determine if each of the $(N/2)!$ permutations of the subset $S_1$, and the $$\frac{N!}{\left(\frac{N}{2}\right)!\cdot\left(\frac{N}{2}\right)!}$$

partitions of the N input items, have been produced. More particularly, the index register C testing and decrementing unit 43 operates to transfer control to the $S_1$ subset permuting control unit 33 and to decrement the register C by 1 if this register contains a digital number greater than 1. If the contents of the index register C is 1, the unit 43 is inactive, hence indicating that all permutations of the subset $S_1$ have been produced.

Similarly, the partitioning test unit 44 places the digital word 00010 in the operation counter 12 when less than the $$\frac{N!}{\left(\frac{N}{2}\right)!\cdot\left(\frac{N}{2}\right)!}$$

possible partitionings of the N input quantities have been generated by the control unit 32. Conversely, if all the possible partitionings of the input list have been exhausted, the control unit 44 is inactive, hence indicating that each of the N! permutations has been produced. To determine whether all possible partitionings have been generated, the partitioning test unit 44 examines an index number which is stored in the operation store 20 by the partition generating control unit 32 and which indicates the number of possible remaining partitionings of the input list. When this index number indicates that there are zero remaining partitionings, the partition completion test control unit 44 becomes inactive as indicated earlier.

An output utilization control unit 41 is employed in the FIG. 1 organization to operate on the permuted input items in the particular manner desired. For example, if the aforementioned traveling salesman problem were being investigated, the output control unit 41 would be operable to sum the route distance in accordance with the path indicated by the particular ordering of the cities, as given by the $S_1$ and $S_2$ permuted subsets stored in the operand store 20.

The over-all functioning of the FIG. 1 arrangement may be more clearly understood by referring to the signal flow diagram therefor illustrated in FIG. 3. The numerals shown in parentheses in each of the functional blocks included therein correspond to the similarly designated FIG. 1 control units and operational circuitry which most directly participate in the performance of the corresponding function.

Starting at the upper portion of FIG. 3, a list of N input items and $(N/2)!$ interchange characters are first read into the operand store 20. Then, the N input quantities are partitioned into two like size disjoint subsets $S_1$ and $S_2$, and stored in the corresponding locations $S_1+1$ through $S_1+(N/2)$ and $S_2+1$ through $S_2+(N/2)$ illustrated in FIG. 2. Next, one permutation of each of the subsets $S_1$ and $S_2$ is generated, and the output task of interest is performed upon the over-all ordering of the $S_1$ and $S_2$ subgroupings of the N input items. Responsive to the completion of the output operation, the next permutation of the subset $S_2$ is effected, with the output utilization control unit 41 being enabled by this new ordering. This functional cycling, indicated as operational loop 1 in FIG. 3, continues until all orderings of the subset $S_2$ have been produced. When all the permutations of the subset $S_2$ have been completed the next, or second ordering of the subset $S_1$ is effected. Following this, each of the $(N/2)!$ permutations of the subset $S_2$ are again produced by operational loop 1, with the output unit 41 again being operative responsive to each ordering of the N input items.

The above-described circuit functioning, identified as operative loop 2 in FIG. 3, recurs until each of the possible permutations of the subset $S_1$ has been generated. As noted above, functional loop 1 is respectively executed $(N/2)!$ times for each of the $(N/2)!$ translations through the loop 2. Hence, a total of $$\left(\frac{N}{2}\right)!\cdot\left(\frac{N}{2}\right)!$$

permutations are generated for each partitioning of the N input quantities.

Each time loop 2 has been executed the full $(N/2)!$ cycles, system control is returned to the partition generating control unit 32 to effect the next partitioning of the N input objects. This circuit functioning corresponds to outer operative loop 3 illustrated in FIG. 3.

As mentioned hereinabove, N distinct objects may be combined into two disjoint subsets of $N/2$ elements each a total of $$\frac{N!}{\left(\frac{N}{2}\right)!\cdot\left(\frac{N}{2}\right)!}$$

ways. Thus, the middle operative loop 2 is traversed $$\frac{N!}{\left(\frac{N}{2}\right)!\cdot\left(\frac{N}{2}\right)!}\cdot\left(\frac{N}{2}\right)!=\frac{N}{\left(\frac{N}{2}\right)!} \tag{3}$$

times, and the innermost loop 1 is executed $$\frac{N!}{\left(\frac{N}{2}\right)!\cdot\left(\frac{N}{2}\right)!}\cdot\left(\frac{N}{2}\right)!\cdot\left(\frac{N}{2}\right)!=N! \tag{4}$$

times, which corresponds to the total number of possible permutations of the N objects. It should be noted that the most often employed circuit operations, viz., those included within the confines of the loop 1, are relatively simple and are adapted to generate the permutations of only $N/2$, rather than N quantities. This may be more forcefully illustrated by considering that 10! equals 3,628,800, while $(10/2)!$ is only 120. Also, it is observed that if $N=10$ in the FIG. 1 arrangement, only $N/2!=120$ storage locations must be included in the operand store 20 to contain the interchange characters $a_0$ through $a_{119}$. However, if permutations were directly generated on the 10 input items by the hereinconsidered interchange method, 3,628,800 interchange character storage locations would be required, and this number of storage locations is prohibitively large.

To further illustrate the circuit operation of the FIG. 1 permutation generating embodiment, assume now that it is desired to generate the permutations of six input items respectively designated by the reference numerals 1, 2, 3, 4, 5, and 6 which are applied over the input lead 24. Accordingly, the input list read-in control unit 30, when energized by the operation counter 12, causes the input-output unit 18 to place the six input numbers in the store 20 in digital form. The next enabled control unit 31 operates to place the interchange characters 2, 1, 2, 1, 2, and 1, generated in accordance with Equation 1 and applied over the input lead 24, into the $(6/2)!$, or six storage locations beginning with $\alpha_0$ which precede the address ICHNGE shown in the FIG. 2 replica of the operand store 20.

After the above-described initialization of the store 20 is completed, the control unit 32 generates the first partitioning of the six input quantities into like size subsets $S_1$ and $S_2$. For purposes of illustration, assume that the items 1, 2, and 3, and 4, 5, and 6 respectively embody the subgroups $S_1$ and $S_2$. Accordingly, these items are respectively placed in the storage addresses $S_1+1$, $S_1+2$, and $S_1+3$, and $S_2+1$, $S_2+2$, and $S_2+3$.

Following the above partitioning process, the $S_1$ subset permuting control unit 33 is adapted to set the index register B to $(6/2)!=6$, and also to generate the first permutation of the subset $S_1$ in accordance with the first interchange character, viz., the number 2, which is contained at the storage location $\alpha_0$. Hence, the unit 33 functions to interchange the second and third elements of $S_1$ to produce the newly ordered $S_1$ subgrouping 1, 3 and 2. The precise operation of the unit 33 identically parallels that given above in detail for the $S_2$ permuting unit 50.

The control units 34 through 40 included in the composite arrangement 50 are functionally adapted to generate a new ordering of the subset $S_2$ during each execution thereof. During the first energization of these units, the $LX-(N/2)!-A$ control unit 34 loads the index register A with the digital number $(6/2)!=6$. Then the interchange character 2, contained in the $\alpha_0$ storage location ICHNGE-6 is supplied to the accumulator register 15 under control of the $CLA-IC-A$ unit 35, and a $-2$ is written into the index register B by the $PNA-B$ control unit 36.

The $CLA-S_2-B$ and $LDQ-S_2+1-B$ control units 37 and 38 are next sequentially operative to translate the $S_2$ subset element characters 5 and 6, contained at the $S_2$ subset storage addresses $S_2+2$ and $(S_2+1)+2=S_2+3$, into the AC and MQ registers 15 and 16 respectively. Finally, the $STO-S_2+1-B$ and $STQ-S_2-B$ control units 39 and 40 respectively place the $S_2$ subset characters 5 and 6, included in the AC and MQ registers 15 and 16, into the storage locations $S_2+3$ and $S_2+2$. Hence, the permuted $S_2$ elements contained in the store 20 address locations $S_2+1$ through $S_2+3$ comprise the ordered numerals 4, 6, and 5 and, moreover, the entire six-element input list contained in storage locations $S_1+1$ through $S_1+3$ and $S_2+1$ through $S_2+3$ comprises the ordered group 1, 3, 2, 4, 6, and 5.

The operation counter 12 next enables the output utilization control unit 41 which operates on the above-enumerated permuted input set in accordance with the particular investigation under consideration. Upon completion thereof, the testing unit 42 examines the index register A, and determines that the number stored therein, viz., a digital 6, is greater than 1. Accordingly, the unit 42 subtracts a 1 from the contents of register A leaving a digital 5 therein, and writes a 01011 binary word in the operation counter 12.

The counter 12 hence next energizes the $CLA-IC-A$ control unit 35 which is at this time operative to place the digital 1 stored at the $\alpha_1$ address location ICHNGE-5 into the accumulator register 15. The control units 36 through 40 then function to reverse the storage locations of the elements contained in the addresses $S_2+1$ and $S_2+2$ in the manner described above, such that the new permuted $S_2$ subset, i.e., 6, 4, and 5, now resides in the storage locations $S_2+1$ through $S_2+3$.

The above mode of operation, which corresponds to functional loop 1 shown in FIG. 3, cyclically recurs until the testing unit 42 detects a digital 1 in the index register A, which indicates that all six permutations of the three $S_2$ subset elements have been produced. At this point, the next-enabled testing generator 43 determines that the index register C, associated with the $S_1$ subset permuting arrangement 33, contains a digital 6 therein, which number is greater than 1. Hence, the unit 43 decreases the contents of the register C by 1, and transfers system control via the operation counter 12 to the unit 33 to generate the next permutation of the $S_1$ subset. Responsive to this and each following $S_1$ subset ordering, each of the six permutations of subset $S_2$ is again produced by the above-described permuting control unit 50.

When all six of the $S_1$ subset orderings have been effected, which corresponds to an exhaustion of the functional loop 2 shown in FIG. 3, the control unit 43 passes control to the partition testing unit 44. At this time, the unit 44 determines that only one of the $$\frac{6!}{\left(\frac{6}{2}\right)!\cdot\left(\frac{6}{2}\right)!}=20$$

partitions of the six input objects has been effected. Accordingly, the unit 44 writes a 00010 binary word into the operation counter 12 which hence next enables the partition generating control unit 32. The control unit 32 then generates the next partitioning of the six input objects, and the $S_1$ and $S_2$ subset permuting arrangements 33 and 50 are again repetitively operative in the above-described manner.

When all twenty partitionings of the input list have been performed, corresponding to a completion of functional loop 3 shown in FIG. 3, each of the desired permutations has been effected and the FIG. 1 arrangement is correspondingly rendered inactive. Moreover, it is observed that the FIG. 1 permutation generating arrangement has produced the 6! orderings of the six-element input set in a rapid and relatively simple manner, in that the most often utilized control units, viz., the units 35 through 40 included in the $S_2$ permuting unit 50, accomplish a relatively simple digit interchange operation on a small subset containing only three elements.

It is noted at this point that while the FIG. 1 arrangement was depicted as comprising two like size partitioned subsets $S_1$ and $S_2$, such partitioning is not restricted either to two subsets, or to like size subgroupings. In general terms, a set of N input objects may be partitioned into $j$ subsets, with $j$ sequentially-operated subset permuting units and $j$ testing control units replacing the corresponding pairs of arrangements 33 and 50, and 42 and 43 shown in FIG. 1. In addition, each of the $j$ partitiond subsets may comprise any number of elements, although the over-all arrangement is most efficiently operated when such subset sizes are selected to be nearly equal in size. However, in general terms, a different list of interchange characters must be included in the operand store 20 for each different size subgrouping.

To summarize, an illustrative calculating arrangement made in accordance with the principles of the present invention embodies a plurality of nested iteratively-traversed functional loops to generate the permutations of N objects. The outer loop partitions the N objects into fixed size subsets, and the inner loops respectively comprise element interchanging operations for generating permutations of a corresponding subset of the input items.

The arrangement generates permutations at a rapid rate by reducing the problem of large N to one of small N. In addition, the embodiment requires a relatively small amount of storage capacity which is effectively independent of the magnitude of the input list.

It is to be understood that the above-described arrangement is only illustrative of the application of the principles of the present invention. Numerous other arrangements may be devised by those skilled in the art without departing from the spirit and scope thereof.

What is claimed is:

1. In combination, digital storage means, means for writing a plurality of input quantities into said storage means, means for generating a plurality of partitions of said quantities into two disjoint subsets $S_1$ and $S_2$, means responsive to each partitioning of said input quantities by said generating means for effecting a plurality of permutations of the quantities included in said $S_1$ subset, and means responsive to each permutation of said $S_1$ subset for generating a plurality of permutations of the quantities included in said $S_2$ subset.

2. A combination as in claim 1, wherein each of said $S_1$ and $S_2$ subset permuting means comprises means for reading a plurality of interchange characters into said storage means, and means for sequentially interchanging the storage locations of selected subset quantities in accordance with sequentially selected ones of said interchange characters.

3. A combination as in claim 2 wherein each of said $S_1$ and $S_2$ subset permuting means further comprises an associated index register, and wherein said quantity interchanging means includes means operative in accordance with said selected interchange character contained in a storage location specified by said associated index register.

4. A combination as in claim 3 further comprising means for testing and decrementing said index registers included in said $S_1$ and $S_2$ subset permuting means.

5. A combination as in claim 4 further comprising output utilization means operative in response to each unique ordering of said input quantities generated by said $S_1$ and $S_2$ subset permuting means.

6. A permutation generator comprising operand storage means, means for writing a plurality of input quantities into said storage means, means containing a plurality of quantity interchanging characters, and means for sequentially interchanging the storage locations of only two at a time of said input quantities in accordance with said element interchanging characters.

7. A combination as in claim 6 wherein said sequential quantity interchanging means comprises an index register, means for interchanging the storage locations of two adjacent quantities in accordance with a selected interchange character specified by said index register, and means for iteratively changing the contents of said index register and for enabling said adjacent quantity interchanging means.

8. A combination as in claim 7 wherein said stored interchange characters are specified by $a_3(j)=1$ and 2 when $j$ is respectively odd and even, and $$a_{k+1}(j)=\begin{cases} k \text{ if } j^*=0 \text{ or } k! \\ a_k\left((k-1)!\left[\frac{j-k}{k^*}\right]+k-j^*\right) \text{ if } j^*<k! \\ a_k\left((k-1)!\left[\frac{j-k}{k^*}\right]+k+j^*\right) \text{ if } j^*>k! \end{cases}$$

for $k\geq 3$, when $a_r(x)=a_r(x+r!)$, $k^*=k!+(k-1)!$, wherein $j^*=j-k \pmod{k^*}$ such that $0\leq j^*<k^*$ and $[x]$ denotes its greatest integer not exceeding $x$, and where $a_{k+1}(j)$ identifies the $j$th interchange character corresponding to a set of $k+1$ input quantities, with $k$ and $j$ being independent positive integers such that $$0\leq j\leq k-1$$

References Cited

UNITED STATES PATENTS

| | | | |
|---|---|---|---|
| 2,856,595 | 10/1958 | Selmer | 340—174 |
| 2,978,680 | 4/1961 | Schulte | 340—172.5 |
| 3,038,660 | 6/1962 | Honnell et al. | 235—180 |

OTHER REFERENCES

Ledley: Programming and Utilizing Digital Computers, McGraw-Hill 1962. Copy in Group 230, pp. 78–80, 405 and 476 relied on.

PAUL J. HENON, *Primary Examiner.*

ROBERT C. BAILEY, *Examiner.*

R. M. RICKERT, *Assistant Examiner.*